D. W. McNEIL.
HOT AND COLD WATER COCK.
APPLICATION FILED JUNE 23, 1910.
990,894.
Patented May 2, 1911.
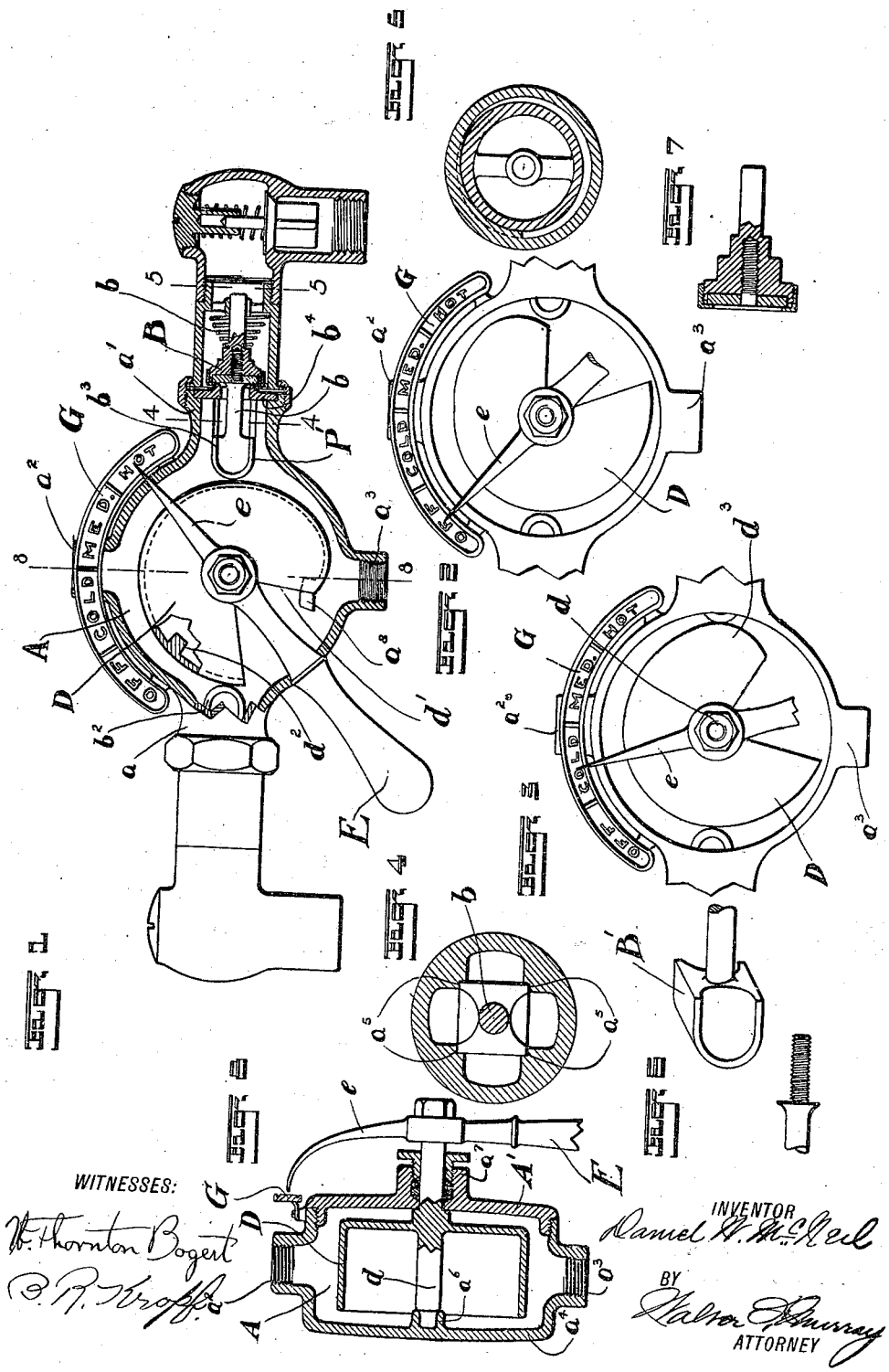
WITNESSES:
INVENTOR
Daniel W. McNeil
BY
Walter E. Murray
ATTORNEY

UNITED STATES PATENT OFFICE.

DANIEL W. McNEIL, OF CINCINNATI, OHIO, ASSIGNOR TO JOHN DOUGLAS COMPANY, OF CINCINNATI, OHIO, A CORPORATION OF OHIO.

HOT AND COLD WATER COCK.

990,894.　　　　　Specification of Letters Patent.　　Patented May 2, 1911.

Application filed June 23, 1910.　Serial No. 568,441.

*To all whom it may concern:*

Be it known that I, DANIEL W. McNEIL, a citizen of the United States of America, and resident of Cincinnati, county of Hamilton, State of Ohio, have invented certain new and useful Improvements in Hot and Cold Water Cocks, of which the following is a specification.

My invention relates to hot and cold water cocks, in which the stems of the hot and cold water valves are contacted by a cam upon the actuating spindle, to raise the valves from their seats.

Valves of this kind have been subject to the objections, first, that the valve stems and the actuating cam too readily became worn, so that the valves were not then properly carried from their seats upon turning the actuating spindle, and second, that to prevent leakage, constructions of casing and valves were used which were difficult of manufacture.

The object of my invention is a hot and cold water cock, in which there is a minimum wear between the stems and the valves and the cam of the actuating spindle, and which may be manufactured readily.

Referring to the accompanying drawings, in which like parts are indicated by simple reference letters, wherever they occur throughout the various views, Figure 1 is a view partly in elevation and partly in central vertical section, of a hot and cold water cock embodying my invention. Figs. 2 and 3 are detail views showing the cam and the valve stems in different positions from that shown in Fig. 1. Figs. 4 and 5 are sectional views upon somewhat enlarged scales taken upon lines 4—4 and 5—5 respectively, of Fig. 1. Fig. 6 is a detail perspective view of the ends of the valve stem, the central part of the stem being broken away. Fig. 7 is a view partly in section and partly in elevation of one of the valves. Fig. 8 is a sectional view upon line 8—8 of Fig. 1, showing the cap in place.

The cock embodying my invention consists of a shallow cylindrical casing A, having at diametrically opposite sides admission ports $a$ $a'$, for hot and cold water respectively, and intermediate the hot and cold water ports exit ports $a^2$ $a^3$, to be connected with the pipes leading to shower baths, or some such devices.

The opening of the hot and cold water ports is regulated by valves B, which are normally held to their seats by springs $b$, and which have valve stems $b^2$ $b^3$ projecting inward in proximity to a cam D, which is located upon an actuating stem $d$, which is journaled in the valve casing.

The valve casing is in the shape of a shallow cylindrical box, having a closed side $a^4$ and an open side which is closed by a cap A'. The side $a^4$ of the casing has upon its interior a central journal lug $a^6$, and the cap A' has a central opening surrounded by an annular lug $a^7$, which forms a journal bearing in alinement with the journal lug $a^6$, and the actuating stem $d$ is journaled in the lugs $a^6$ and $a^7$.

The ports $a$ $a'$ $a^2$ $a^3$ are surrounded by annular extensions of the casing, the extensions around ports $a$ $a'$ having recesses, which seat rings $b^4$, which form the seats for the valves B. The extensions around ports $a$ $a'$ have angular ways $a^5$ cut in them upon their interior, in which the angular sides of the enlarged ends B' of the valve stems fit.

The ends B' of the valve stems are made semi-cylindrical in shape, so as to afford a broad and even bearing for the cam D, whose periphery is made of the width of the end of the valve stem. The travel of the cam is limited by a stop lug $a^8$, which contacts at one limit of the travel with the side $d'$ of the cam, and at the other limit with a lug $d^2$ secured to the cam.

The end of the valve stem $d$ carries a handle E, one end of which is provided with a pointer $e$, which travels over a segmental indicator G.

In use:—the port $a$ having been connected with a source of hot water, and the port $a'$ with a source of cold water, when the finger of the handle registers with the word "Off" of the indicator, the cam contacts neither of the valve stems, so that the springs $b$ hold the valves B to their seats. When the handle is turned to the position for admitting cold water, such as shown in Fig. 3, the side $d^3$ of the cam contacts with the valve stem upon the cold water side and carries it from its seat. The cam in this position does not contact with the stem within the hot water port $a$. When the handle is carried to the "Medium" position, the cam contacts with both valve stems and raises both valves from their seats, admitting both hot and cold water to the casing. When the handle is carried to the "Hot" position, the cam contacts with the stem within the hot water port $a'$, and carries the valve to its fully open position, while admitting the valve in the cold water channel to be carried to its seat by the spring. In all of these positions of the valve stem, the cam and the actuating stem, there is no lost motion, for the reason that the actuating stem is journaled accurately at both of its ends in the valve casing, the valve stems are guided accurately at right angles to the contacting faces of the cams, by the angular ways $a^5$, and the contact between the cams and the valve stems are always accurate, because of the breadth and shape of the bearing surfaces of the valve stems and the cam. This accurate movement of the valves likewise permits the valves to be brought firmly and squarely to their seats, so as to prevent leakage of either of the valves when it is seated.

What I claim is:—

1. In a hot and cold water cock, the combination of a shallow cylindrical casing having hot and cold water ports formed in its wall, an actuating stem journaled in the sides of the casing, a cam secured upon the actuating stem within the casing, valves adapted to regulate the opening and closing of the hot and cold water ports, said valves having inwardly projecting valve stems with semi-cylindrical enlargements adapted to contact with the periphery of the cam, and means for holding said heads in contact with the periphery of the cam.

2. In a hot and cold water cock, the combination of a shallow cylindrical casing having upon its periphery extensions surrounding hot and cold water ports, said extensions having upon their interior angular radial ways, valves for regulating the opening and closing of the hot and cold water ports, valve stems with enlarged heads fitting the ways within the extensions, an actuating stem journaled in the sides of the valve casing, and a cam with a broad periphery adapted to engage the enlarged heads of the stems, and means for holding the heads of the stems in contact with the periphery of the cam.

3. In a hot and cold water cock, the combination of a shallow cylindrical casing having upon its periphery annular extensions surrounding hot and cold water ports, and having upon their interior angular radial ways, valve seats formed within the extensions, valves adapted to contact with the valve seats, valve stems having upon their ends semi-cylindrical enlargements adapted to engage the radial ways, a cam within the valve casing adapted to engage the enlarged heads, and means for rotating the cam.

DANIEL W. McNEIL.

Witnesses:
WALTER F. MURRAY,
B. R. KROPF.

---

Copies of this patent may be obtained for five cents each, by addressing the "Commissioner of Patents, Washington, D. C."